United States Patent Office 3,578,506
Patented May 11, 1971

3,578,506
SEALING ARRANGEMENT FOR TERMINALS OF ELECTROCHEMICAL GENERATORS
René Chassoux, Talence, France, assignor to Société des Accumulateurs Fixes et de Traction (Société Anonyme), Romainville, France
Filed Apr. 7, 1969, Ser. No. 813,885
Claims priority, application France, May 30, 1968, 153,442
Int. Cl. H01m 1/02
U.S. Cl. 136—168
15 Claims

ABSTRACT OF THE DISCLOSURE

Sealed electrochemical generators and a sealing arrangement for the terminals of electrochemical generators which project outwardly of a metallic cover which provides effective sealing as well as electrical insulation of the terminals from the metallic cover.

BRIEF SUMMARY OF THE INVENTION

Effective sealing of electrode terminals projecting outwardly of the cover of an electrochemical generator is of major importance. In the past when the container cover has been of insulative material various sealing arrangements have been provided. Since such covers themselves were of insulative material no problem of insulating the terminals from them existed even if the casing itself was metallic or otherwise conductive.

However, when the casing covers as well as the casings are metallic or otherwise conductive, the problems of insulating the terminals as well as sealing them at their projections through apertures in the cover must be solved effectively, bearing in mind that the metallic cover and metallic terminals may have differing rates of expansion and contraction.

The present invention relates more particularly to those electrochemical generators having a metallic cover and has as an object and feature the provision of means for simultaneously functioning as a seal and as an insulator for the electrode terminals by use of a particular form of sealing element.

In the arrangement disclosed, the sealing element is mounted externally of the casing and is compressed against a seat formed in the cover around the terminal outlet orifices or apertures in said cover and against a preferably round and cylindrical part of the terminal post passing through the orifice and against a wedging part integral with the terminal post or separate and against an insulative member the external base of which abuts a peripheral surface of the seat on the cover.

Thus, according to a characteristic of this invention, the sealing element said wedging part and said insulative member which functions to compress the sealing element preferably are of insulative or non-conductive materials, the sealing element being of a compressible elastomer or plastic of natural or synthetic materials, the wedging part and the insulative member being preferably of a rigid synthetic material. In compression, the sealing element is deformed and spread out to cover the rounded lip of the terminal orifice in the cover through which a particular terminal projects and thus insulates it from the terminal post as well as providing an effective seal.

Preferably, the sealing element is of ring-like shape and has two portions, namely, an enlarged portion forming a head or bead which is substantially torical and is too large in diameter to pass through the space defined between the cover orifice and terminal post projecting through it, and a reduced thinner portion forming a skirt constituting an integral extension of the head whose inner and outer diameters correspond respectively to the diameters of the terminal post and of the cover orifice and whose axial length is sufficient to permit the skirt portion to project downwardly of the orifice and be deformed and spread out to cover the rounded orifice lip when the sealing element is compressed in place as will be described.

Another feature of this invention is that the wedging part has substantially truncated conical form whose conically shaped portion is forced into the thin skirt portion of the element on compression and thus has a tendency to roll and spread the lower edges of said skirt portion around the rounded orifice lip to cover it for insulative purposes. Said part is able to be forced upwardly through the orifice into the lower end of the skirt portion of the sealing element after the cover has been secured to the casing for purposes of spreading and rolling the skirt portion around such lip by a wedging action of its conical or tapered surface.

Other objects and features of the invention will become apparent from the following detailed description and the accompanying drawings, wherein.

DETAILED DESCRIPTION

Figure 1:
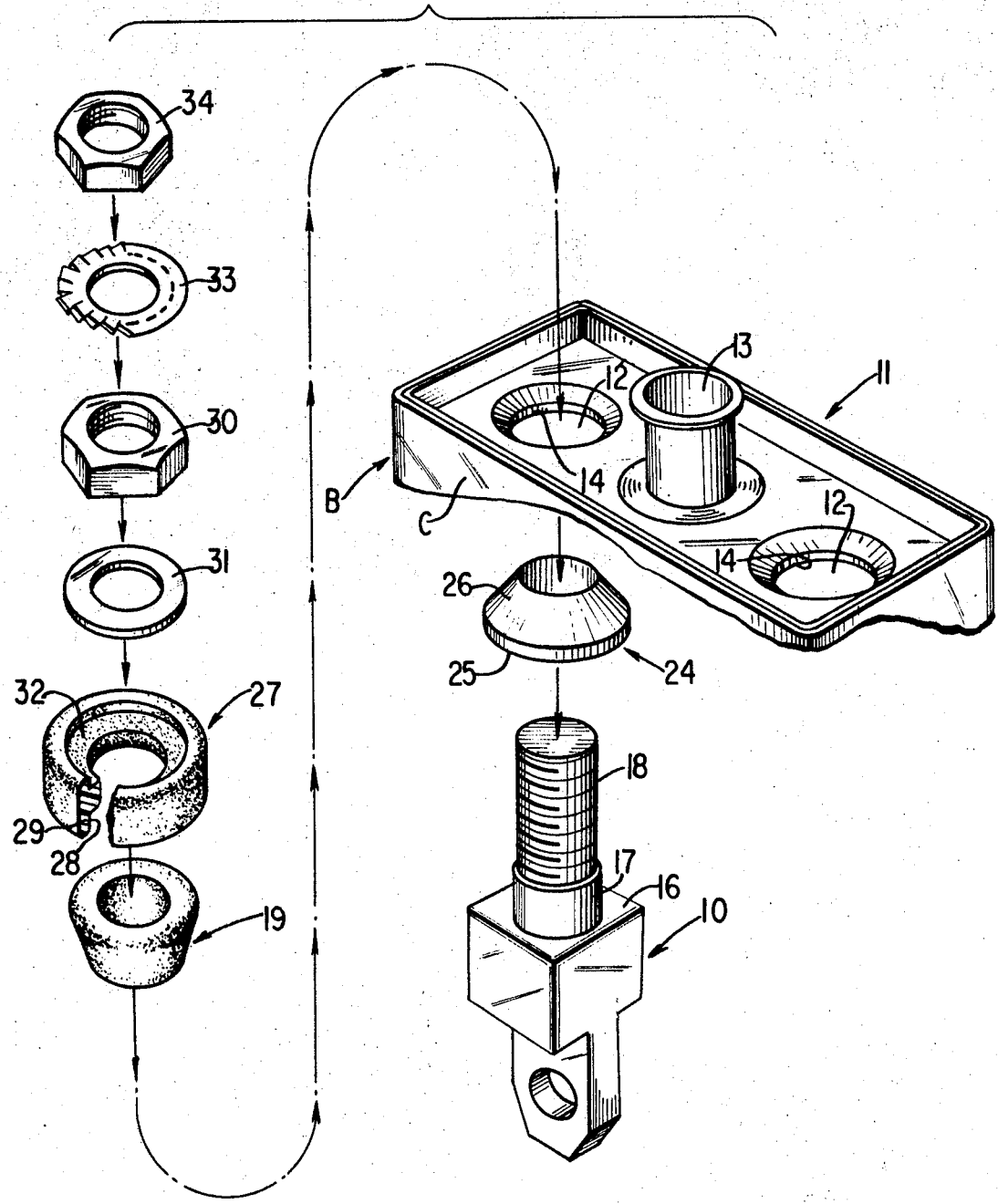
FIG. 1 is an exploded perspective view of the components that are adapted to provide a seal and insulation for respective of the electrode terminals that protrude through the metallic cover of the electrochemical generator in accord with the invention.
Figure 2:
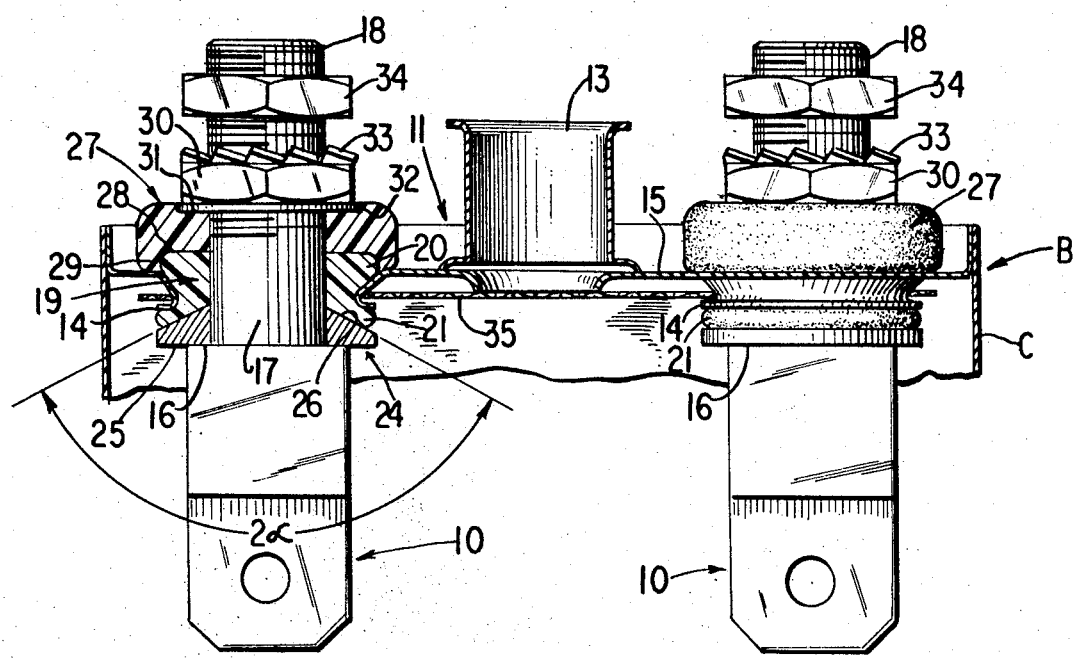
FIG. 2 is a fragmentary partially sectionalized view of the sealing and insulating means for the electrode assembly in their assembled condition.

Referring now to the drawings, the electrochemical generator or cell or battery B containing electrodes are positioned within an open topped preferably metallic casing C and said electrodes are respectively provided with electrode terminals 10 which project upwardly and outwardly of said casing C. A metallic cover 11 is provided for the casing C. This cover 11 has a pair of trough shaped tapered orifices 12 whose inwardly tapered walls define a seat for purposes to be described. The cover 11 also has a fill orifice 13 through which electrolyte may be introduced after the cover has been affixed to the casing C as by welding or the like. The minimal diametered portions of the orifices 12 are rounded or rolled back as by deep drawing or turning during the formation of the sheet metal cover 11 to provide reverse bends or lips 14 that extend substantially parallel with the wall surface 15 of the cover as can be seen in FIG. 2.

Each of the terminals 10 is provided with a base portion 16 from whose upper surface an integral cylindrical post 17 extends and whose outermost portion 18 is threaded. The posts 17 project outwardly through the orifices 12 when the cover 11 is mounted on casing C. The diameter of posts 17 is less than the minimal diameters of the orifices 12 at their respective lips 14.

Figure 3:
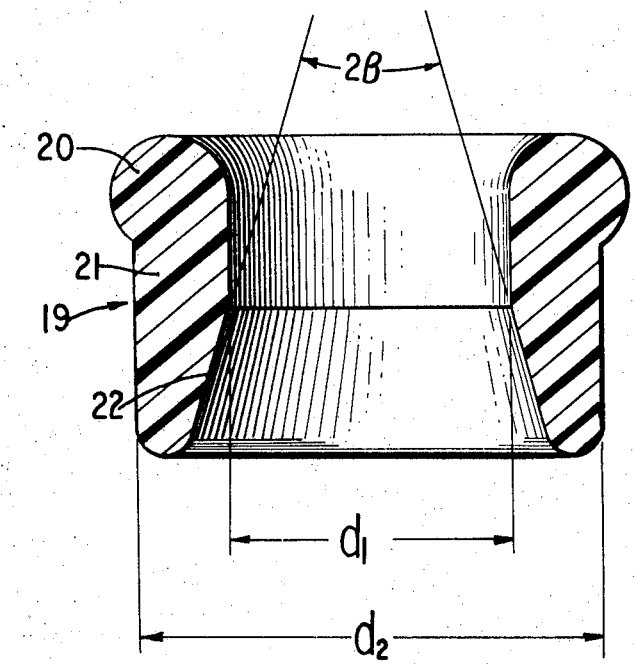
FIG. 3 is an enlarged sectional view of one of the sealing elements.

A sealing element 19 of elastic insulating material made of an elastomer that resists chemical action and service conditions made, for example, of neoprene is provided for mounting on the outwardly projecting portion of respective posts 17 after the cover 11 has been secured on the casing C. A particularly advantageous form of sealing element 19 is illustrated in detail in FIG. 3. This element 19 is of ring shape whose upper portion is provided with an enlarged rounded bead or head 20 of torical section whose outer diameter is greater than the diameter defined by the minimal diameter of lip 14 of the orifices so that it cannot pass through the space defined between the lip 14 and terminal post 17. A narrower diametered, cylindrical portion 21 integral with head or bead 20 extends downwardly therefrom to form a skirt whose maximum external diameter $d_2$ is substantially equal to the minimal aperture diameter defined at the lip 14. The internal diameter $d_1$ of member 19 at 21 is substantially equal to that of a post 17. The lower internal surface of skirt 21 is tapered at 22 as seen in FIG. 3, and defined by a conical internal surface whose vertex angle is $2\beta$ so that when a sealing element 19 is mounted on a respective post 17 and its skirt portion is projected through the orifice 12, the thinner lower portion of the skirt can be rolled over to completely cover the reversely bent portion of lip 14.

To facilitate this rolling over and covering action by the lower portion of skirt 21 and over lips 14 when the sealing element 19 has been mounted on a post 17 and projected through the orifice 12, wedging means 24 of substantially truncated conical shape is provided on each post 17 with its flat base 25 resting on the upper surface of the base portion 16 and its tapered surface 26 projecting upwardly at a semi-angle $\alpha$ and relative to the axis of post 17 toward a vertex. The tapered surface 26 of this wedging member is adapted to enter the tapered portion 22 of the skirt 21 of sealing element 19 when the latter is compressed so as to spread and roll the thinned lower portion of said skirt 21 laterally around the lip 14 to completely cover them, thus effectively insulating the post 17 from the metallic cover 11. The wedging 24 is of relatively rigid material which optionally is also insulative, or it may be of metal and if the latter be even made integral with the base portion 16 of said post 17.

In order to effect sealing compression of element 19 relative to post 17 and lip 14 as well as the seat of orifice 12 of the cover 11, a ring-like insulative element 27 of relatively rigid material such as polypropylene is provided. This element 27 has an annular recess 28 in its lower end to receive the head or bead 20 of the sealing element 19. The annular external lip 29 of element 27 is adapted to abut the upper outer surface 15 of cover 11 when compression of said element 19 is effected.

In order to prevent damage to element 27 upon tightening of the tightening nut 30 that is screwed onto the threaded portion 18 of post 17, a metallic washer 31 is interpolated on post 17 between nut 30 and a recess 32 provided in the upper end surface of element 27. This washer 31 serves to uniformly distribute pressure exerted by nut 30 on element 27 when said nut 30 is tightened. A lock washer 33 and lock nut 34 designed to be tightened on threaded portion 18 of post 17 above nut 31 are also provided.

With the components above described and assembled on the posts 17, tightening of nut 30 after the cover 10 has been secured to the casing C effects the following action. The terminal 10 is drawn upwardly through the aperture 12 until the sealing element 19 becomes tightly fitted and sandwiched between the insulative element 27 and wedging element 24 which causes said sealing element to be deformed and pressed tightly against the surface of post 17. It also causes the lower end of its skirt portion to be rolled and spread about the lip 14 of the orifice 12 and compressed against it. It also causes its head or bead portion 20 to be tightly compressed in the groove or recess 28 and also against the flared surface 26 of the wedging part 24. Thus, an effective seal is provided for the terminal 17 at its projection through the lower aperture and simultaneously, the rolling over and covering of the lip by the skirt portion effectively insulates the terminal post from the metallic cover 11.

While preferably the wedging part 24 is a separate entity enabling use of smaller sized terminals 10 than those heretofore required for effective sealing and insulation, where the terminals are intended to conduct very high intensity currents the wedging part may be made integral with said terminals and be of the same material.

In addition, the orifices 12 can be reinforced if necessary by a reinforcing member 35 mounted around the reentrant portions of the orifices 12 and which can be of screen-like construction spanning both orifices and underlying the fill opening 13 to serve as a filter screen for electrolyte that is to be introduced via fill opening 13.

While specific embodiments of the invention have been disclosed, variations in structural detail within the scope of the appended claims are possible and are contemplated. There is no intention of limitation to the exact abstract or disclosure herein presented.

What is claimed is:

1. An electrical device such as an electro-chemical generator comprising a casing, a metallic closing-off cover for said casing, said cover having a pair of trough shaped tapered orifices that define a seat and reversely bent lips, output terminals of conductive material for said device projecting outwardly of the casing through respective of said orifices in said cover, a sealing and insulating arrangement for said output terminals with respect to said orifices, said arrangement comprising a single resilient sealing element of insulative material for each said orifice, each sealing element being of ring-like shape one being mounted externally of the cover on each said terminal to surround it and project through the respective orifices and being compressed tightly against said seat of the cover and against the terminal, each said sealing element having a portion deformed in compression to cover each such lip and insulate the respective terminal therefrom as well as provide effective sealing between such terminal and the orifice, means on each terminal to effect such deformation of such portion of said sealing element, and means on each terminal externally of said cover to effect tightening and sealing compression of the sealing element mounted thereon.

2. An electrical device according to claim 1, wherein each sealing element has an external head portion resting in said seat and against which it is compressed upon tightening of said last-named means.

3. An electrical device according to claim 1 in which each sealing element includes a head portion shaped to lie on said seat without passing through the underlying orifice and each sealing element includes a skirt portion integral with the head portion that projects through the respective underlying aperture and is deformed to cover the corresponding lip to insulate the respective terminal from the cover.

4. An electrical device according to claim 1, wherein said means for effecting said such deformation of the sealing element includes a tapered surface provided on each of the respective terminals below the cover.

5. An electrical device according to claim 4, wherein said means comprises a separate element mounted on each terminal on which said tapered surface is provided.

6. An electrical device according to claim 1, including an additional insulative member on each terminal having a recess in which the upper end of said sealing element is positioned.

7. An electrical device according to claim 6, wherein said additional insulative member on each terminal has a further recess, and a metallic pressure equalizing washer positioned within said last-named recess.

8. An electrical device according to claim 1, wherein each terminal has a threaded portion and said last-named means is a tightening nut threaded onto such threaded portion.

9. An electrical device according to claim 8 including additionally a lock washer and lock nut for each terminal.

10. An electrical device according to claim 1, wherein each resilient sealing element comprises a head portion of larged diameter than the orifices and an integral skirt portion which is tapered to provide a thinned wall near its bottom which becomes deformed to cover such lips, the internal diameter of said sealing element being dimensioned to fit around the terminal on which it is mounted and said deforming means includes a tapered surface that engages said skirt portion.

11. An electrical device according to claim 10 wherein said terminal has a base portion and upwardly projecting partially threaded post onto which said sealing element is mounted and said deforming means comprises a substantially truncated cone shaped part.

12. An electrical device according to claim 11, wherein said part is of insulative material mounted on said post.

13. An electrical device according to claim 11, wherein said part is metallic and mounted on said post.

14. An electrical device according to claim 13, wherein said part is integral with said post.

15. Electrochemical generators including casings, metallic covers therefor, and conductive terminals projecting outwardly of said covers and including sealing and insulating arrangements for said terminals comprising a single resilient sealing element of insulative material mounted on each terminal externally of the cover and projecting inwardly through lipped apertures in the cover, said element being tightly compressed against both the cover and the terminal on which it is mounted and said sealing element having a skirt portion deformed in compression to cover lips of the apertures and insulate the respective terminals therefrom as well as providing effective sealing between the terminals and apertures, means to effect such deformation, and means to effect tightening and sealing compression of the respective sealing elements as well as insulative covering deformation around said lips.

References Cited

UNITED STATES PATENTS

| | | | |
|---|---|---|---|
| 1,073,107 | 9/1913 | Edison | 136—168X |
| 1,283,779 | 11/1918 | Hutchison et al. | 136—168X |
| 1,360,544 | 11/1920 | Levin | 136—168UX |
| 1,519,867 | 12/1924 | Marko | 136—168 |
| 2,456,246 | 12/1948 | Berg et al. | 136—168 |

DONALD L. WALTON, Primary Examiner

U.S. Cl. X.R.

220—46; 277—166